US012354083B2

(12) United States Patent
Nonni et al.

(10) Patent No.: US 12,354,083 B2
(45) Date of Patent: Jul. 8, 2025

(54) SELF-SOVEREIGN IDENTITY STRUCTURED MESSAGING FOR CROSS CHANNEL AUTHENTICATION

(71) Applicant: Digital First Holdings LLC, Atlanta, GA (US)

(72) Inventors: Bryan Walser Nonni, Atlanta, GA (US); Alexander Simon Lewin, Atlanta, GA (US)

(73) Assignee: Digital First Holdings LLC, Atlanta, GA (US)

( * ) Notice: Subject to any disclaimer, the term of this patent is extended or adjusted under 35 U.S.C. 154(b) by 375 days.

(21) Appl. No.: 17/732,806

(22) Filed: Apr. 29, 2022

(65) Prior Publication Data
US 2022/0253833 A1 Aug. 11, 2022

Related U.S. Application Data

(63) Continuation-in-part of application No. 17/162,663, filed on Jan. 29, 2021.

(51) Int. Cl.
*G06Q 20/36* (2012.01)

(52) U.S. Cl.
CPC .............................. *G06Q 20/3674* (2013.01)

(58) Field of Classification Search
None
See application file for complete search history.

(56) References Cited

U.S. PATENT DOCUMENTS

| 8,392,288 | B1* | 3/2013 | Miller | G06Q 30/06 |
| | | | | 705/26.81 |
| 8,612,317 | B1* | 12/2013 | Harman | G06Q 20/047 |
| | | | | 705/16 |
| 9,875,385 | B1* | 1/2018 | Humphreys | G06Q 30/0635 |
| 11,063,770 | B1* | 7/2021 | Peng | G06F 21/64 |
| 11,507,943 | B1* | 11/2022 | Ashley | G06Q 20/36 |
| 11,914,684 | B2* | 2/2024 | Bernardi | G06F 21/6263 |

(Continued)

OTHER PUBLICATIONS

Michael Kuperberg. Blockchain-Based Identity Management: A Survey From the Enterprise and Ecosystem Perspective (Year: 2020).*

*Primary Examiner* — Jamie H Austin
(74) *Attorney, Agent, or Firm* — Schwegman Lundberg & Woessner, P.A.

(57) ABSTRACT

A customer engages a Financial Institution (FI) for access to an account or a service associated with the account of the customer over a first channel of communication. A decentralized identifier (DID) connection is established between a FI wallet and a Self-Sovereign Identity (SSI)-enabled customer wallet. A structured message that is cryptographically signed is sent from the FI wallet to the customer wallet over a secure channel of communication. The message requests authorization of the customer or requests specific Personal Identifiable Information (PII) of the customer. The customer responds via the customer wallet and a second structured message is cryptographically signed and sent to the FI wallet over the secure channel of communication. When the second structured message is authenticated by the FI, the customer is approved for access to the account or approved for access to the service over the first channel of communication.

10 Claims, 3 Drawing Sheets

(56) References Cited

U.S. PATENT DOCUMENTS

| | | | |
|---|---|---|---|
| 2004/0064373 A1* | 4/2004 | Shannon | G07F 19/201 705/24 |
| 2004/0220964 A1* | 11/2004 | Shiftan | G06Q 20/346 |
| 2010/0257066 A1* | 10/2010 | Jones | G06Q 20/202 705/17 |
| 2013/0110678 A1* | 5/2013 | Vigier | G06Q 30/06 705/26.61 |
| 2013/0138571 A1 | 5/2013 | Vassilev et al. | |
| 2014/0074690 A1* | 3/2014 | Grossman | G06Q 20/047 705/39 |
| 2014/0195361 A1* | 7/2014 | Murphy | G06Q 20/047 705/21 |
| 2014/0244462 A1* | 8/2014 | Maenpaa | G06Q 30/04 705/35 |
| 2015/0058227 A1* | 2/2015 | Dua | G06Q 20/3674 705/67 |
| 2015/0356541 A1* | 12/2015 | Hasegawa | G06Q 20/047 705/24 |
| 2016/0155203 A1* | 6/2016 | Gotanda | G06Q 20/20 705/33 |
| 2016/0292677 A1* | 10/2016 | Karlsson | G06Q 20/3276 |
| 2016/0364959 A1 | 12/2016 | Giddy et al. | |
| 2018/0082256 A1* | 3/2018 | Tummuru | H04L 9/3297 |
| 2018/0089660 A1 | 3/2018 | Elliott et al. | |
| 2019/0097812 A1* | 3/2019 | Toth | H04L 9/0841 |
| 2019/0156334 A1 | 5/2019 | Mars | |
| 2019/0370487 A1 | 12/2019 | Veltman et al. | |
| 2020/0074102 A1* | 3/2020 | Pitti | G06F 21/602 |
| 2020/0143019 A1* | 5/2020 | Chen | H04L 9/0643 |
| 2020/0202309 A1* | 6/2020 | Whitelaw | G06Q 20/322 |
| 2020/0220726 A1* | 7/2020 | Lougheed, III | G06F 16/211 |
| 2020/0273031 A1* | 8/2020 | Narayan | G06Q 20/3827 |
| 2020/0336483 A1* | 10/2020 | Murdoch | H04L 9/50 |
| 2020/0403810 A1* | 12/2020 | Murdoch | H04L 67/10 |
| 2021/0124817 A1* | 4/2021 | Todd | G06F 21/44 |
| 2021/0192520 A1 | 6/2021 | Patel et al. | |
| 2021/0218742 A1* | 7/2021 | Cook | G06F 21/31 |
| 2021/0266321 A1* | 8/2021 | Ruff | H04L 63/0884 |
| 2021/0287770 A1* | 9/2021 | Anderson | G16H 40/20 |
| 2021/0366586 A1* | 11/2021 | Ryan | G06Q 20/3224 |
| 2021/0383377 A1* | 12/2021 | Zhou | H04L 9/3213 |
| 2021/0385216 A1* | 12/2021 | Khalil | H04L 9/50 |
| 2022/0094675 A1 | 3/2022 | Madisetti et al. | |
| 2022/0245652 A1* | 8/2022 | Nonni | G06Q 20/401 |
| 2022/0253833 A1* | 8/2022 | Nonni | G06Q 20/3674 |
| 2022/0261789 A1* | 8/2022 | Nonni | G06Q 30/0201 |
| 2022/0366515 A1* | 11/2022 | Behrends | G06Q 20/02 |
| 2023/0075539 A1* | 3/2023 | Pohjola | G06F 21/45 |

* cited by examiner

SELF-SOVEREIGN IDENTITY STRUCTURED MESSAGING FOR CROSS CHANNEL AUTHENTICATION

RELATED APPLICATIONS

This application is a Continuation-In Part (CIP) of application Ser. No. 17/162,663 entitled "Self-Sovereign Identity Verifiable Credentials for Consent Processing" filed on Jan. 29, 2021; the disclosure of which is hereby incorporated by reference herein in its entirety.

BACKGROUND

Enterprises and governments rely heavily and collecting data from their customers and citizens. In fact, private and public information about every individual is almost certainly maintained by a plethora of different entities in a variety of data warehouse located across the globe. This has caused a great deal of problems for individuals and for the enterprises. Individuals' personal and private data are routinely stolen and used for nefarious purposes with the unwittingly assistance of government bureaucrats and government systems to obtain false government identification cards or government benefits. Consumers are frequently targeted and harassed by businesses based on their spending habits, browser history, and location data.

In the midst of this chaos, governments are finally realizing that data about an individual should belong to the individual and not collected and used by businesses, governments, or organizations. Some countries have adopted more stringent laws and regulations should a consumer be harmed by a data breach at an enterprise that houses some of the consumer's data. Some countries have adopted laws that make clear any retention of consumer data needs to have the express informed consent of the consumer and/or requires payment of a fee to the consumer.

Yet, Financial Institutions (FIs) are subject to strict government regulations regarding verifying customers and retaining unique identifying information for their customers. These regulations are referred to as Know Your Customer (KYC) regulations or requirements. What this means is that each time a customer of a FI interacts with the FI, the FI must maintain records that demonstrate that the customer's identity was verified, and the types of information used for identity verification are recorded. For example, when a customer calls their FI for service, the bank employee must ask the customer for a variety of Personal Identifiable Information (PII) in order to comply the KYC requirements and in order to verify the customer's identity. This process exposes customers to risk by revealing PII to call center employees (untrusted third-parties). FIs are required to verify their customers during initial account setup (onboarding of a customer) and when customers request access to their account. There is presently no other mechanism by which FIs can comply with KYC requirements other that ask for PII over potentially insecure communications with the customer.

Consumers are increasingly aware of the vulnerability of their personal data. Data breaches have become almost common place—if not inevitable in the industry.

SUMMARY

In various embodiments, methods and a system for self-sovereign identity (SSI) structured messaging for cross-channel authentication are presented.

According to an embodiment, a method for SSI structured messaging for cross-channel authentication is provided. A request for a service is received over a first channel from a customer. A Decentralized Identifier (DID) is obtained for an SSI-enabled wallet of the customer. A DID connection is established, over a secure channel, between a Financial Institution (FI) wallet and the SSI-enabled wallet using the DID. A structured message challenge is sent to the customer over the secure channel via the SSI-enabled wallet. A structured response is received from the customer over the secure channel via the FI wallet. Access to the service is granted when the structured response is authenticated.

DETAILED DESCRIPTION

Figure 1:
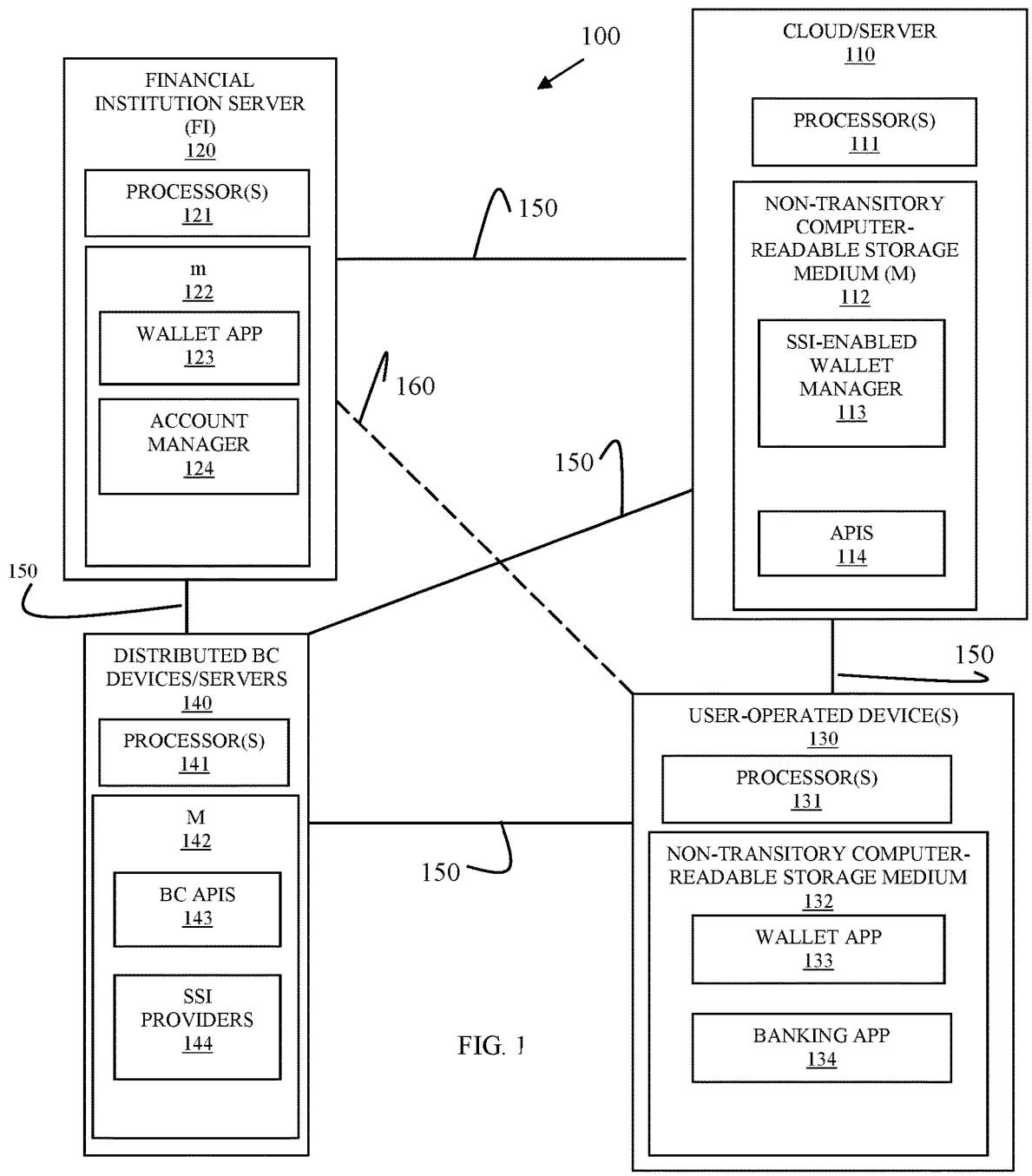
FIG. 1 is a diagram of a system for SSI structured messaging for cross-channel authentication, according to an example embodiment.

FIG. 1 is a diagram of a system 100 for SSI structured messaging for cross-channel authentication, according to an example embodiment. The system 100 is shown schematically in greatly simplified form, with only those components relevant to understanding of one or more embodiments (represented herein) being illustrated. The various components are illustrated, and the arrangement of the components is presented for purposes of illustration only. It is to be noted that other arrangements with more or less components are possible without departing from the SSI structured messaging for cross-channel authentication presented herein and below.

Moreover, various components are implemented as one or more software modules, which reside in non-transitory storage and/or hardware memory as executable instructions that when executed by one or more hardware processors perform the processing discussed herein and below.

System 100 provides verifiable techniques by which a customer can be onboarded for an account with a FI through registration with an SSI provider, can share the appropriate PII needed with the FI using an SSI-enabled customer wallet, and can provide a Decentralized Identifier (DID) for the SSI-enabled customer wallet to the FI. When a customer requests service of the FI post onboarding, the FI obtains the DID for the customer wallet (recorded during onboarding) and uses the PII retained by the FI to issue challenges to the customer's wallet. The customer accesses the wallet through the FI's application and authorizes the communication with the FI or provides the necessary PII requested in the challenge through the wallet. The authorization and/or answers to the challenge are encrypted, signed, and sent to the FI where the customer's identity is authenticated for the initial service requested by the customer. The challenge issued by the FI for authentication and the responses issued by the customer to the challenge are encrypted and signed (by the FI's wallet and the customer's wallet) before being sent. This message passing is referred to as structure messaging that is off chain (off the blockchain (BC)).

The system 100 includes: a cloud/server 110, retail servers/terminals 120, a plurality of user-operated devices 130, and a plurality of blockchain (BC) devices/servers 140.

Cloud/server 110 comprises one or more hardware processors 111 and a non-transitory computer-readable storage medium 112. Medium 112 comprises executable instructions for an SSI-enabled wallet manager and APIs 115. When the executable instructions are provided to processor 111, this causes processor 111 to perform operations discussed herein and below for 113 and 114.

Each FI server 120 comprises one or more processors 121 and a non-transitory computer-readable storage medium 122. Medium 122 comprises executable instructions for a wallet application (app) 123 and an account manager 124. When the executable instructions are provided to processor 121, this causes processor 121 to perform operations discussed herein and below for 123 and 124.

Each user-operated device 130 comprises one or more processors 131 and a non-transitory computer readable storage medium 132. Medium 132 comprises executable instructions for a wallet application (app) 133 and a banking application (app) 134. When the executable instructions are provided to processor 131, this causes processor 131 to perform operations discussed herein and below for 133 and 134.

Distributed BC devices/servers comprises processors 141 and a non-transitory computer readable storage medium 142 for each BC device/server 140. Medium 140 comprises executable instructions for BC APIs 143 and SSI providers 144. When the executable instructions are provided to corresponding processor 141, this causes processor 141 to perform operations discussed herein and below for 143 and 144.

Various network connections 150 and 160 are discussed herein and below between the devices 110-150. Some connections 150 are established directly between devices while other connections 160 are achieved using Decentralized Identifiers (DIDs). DID-based connections 160 providing an anonymous communication session between servers/terminals 120 and user-operated devices 130 based on addressing scheme associated with SSIs; the addresses are resolved through the BC APIs 143. Moreover, although not shown in FIG. 1, during the processing discussed herein and below, there may be DID-based connections 160 between cloud/server 110 and user-operated device 130 and between FI server 120 and cloud/server 110. Still further, although connections 150 are discussed as direct connections between distributed BC devices/servers 140 to 110-113, it is a direct connection only in the sense of the first node/server 140 that is interacting with 110-113.

In various discusses the phrase "issuing authority" or "issuer" are used these may be located on standalone servers, located on server 110, located on a server 120, or located over blockchain devices/servers 140. An issuing authority or issuer is an SSI provider 144 (shown on the BC by 140 in FIG. 1). But it is to be noted that the SSI provider 144 or issuing authority 144 may reside off chain on any server illustrated in FIG. 1 or other servers not illustrated in FIG. 1. Any configuration may be used when referencing an SSI provider 144, an issuing authority 144, and/or an issuer 144 herein and below.

A customer with an existing account with a FI 120 means that such a customer as already provided the requisite PII for KYC requirements of the FI. This type of customer can use app 134 to indicate that the customer wants to opt-in for SSI structured messaging authentication across channels of communication when contacting the FI for service or questions regarding their existing account. When opt-in is selected, an SSI-enabled wallet for the customer is created using an SSI provider 144 (which may be managed and exist on FI server 120 and/or cloud/server 110 rather than as illustrated in BC devices 140 in FIG. 1). Once the SSI-enabled wallet is created, wallet app 133 is initiated on user device 130 and wallet app 123 establishes a connection to wallet app 133 uses the DID of the newly-crated SSI-enabled wallet. The connection also establishes a relationship DID for a unique connection between wallet app 123 and wallet app 133. Both the relationship DID and the DID are stored in account records of the existing account maintained by the FI for the customer. This process is referred to as onboarding for wallet-to-wallet (W2W) structured messaging authentication.

Any customer that does not have any previous account with the FI will need to set up a new account with the FI. This can be done in the traditional manner in person at the FI or can be done as follows. If this type of customer has already registered their PII with a consumer selected SSI provider 144, the customer is asked to provide their SSI-enabled wallet DID, wallet app 123 is used to send W2W structured messages to the customer's wallet app 133, the structured message requests the PII that is needed by the FI to establish an account for compliance with KYC requirements. The customer is instructed to authorizing the sharing of the designated PII from wallet app 133. The SSI provider 144 provides the designated PII to wallet app 123 and account manager 124 stores the designated PII in account records for a new account of the customer. The designated PII can comprise the customer's full legal name, home address, social-security number (SSN), current annual income, etc.

If a customer does not have any previous account and does not have an existing SSI-enabled wallet nor any SSI provider 144, then the customer is asked to provide the designated PII to set up the account records. This can also be done via a FI selected SSI provider 144 (which can be located on FI server 120, on cloud 110, or over the BC devices 140). In BC case, the designated PII is encrypted and stored over distributed BC devices/servers 140 and associated by the SSI provider 144 with the SSI-enabled wallet of the consumer. A DID identifier is associated with the SSI-enabled wallet. The consumer may request a specific relationship DID for the SSI-enabled wallet for the FI (note this is automatically provided with wallet app 123 connects to wallet app 133 using the DID), the relationship DID and DID is provided to wallet app 123 and/or SSI-enabled wallet manager 113 where it is stored in connection with the customer's account. Specific PII that is needed by the FI to establish a new account for the customer is requested by the FI wallet app 123 using the relationship DID for the consumer's SID-enabled wallet. This results in a structured message being sent to the consumer via wallet app 133 requesting that the consumer share the designated PII with wallet app 123. The consumer authorizes the sharing, and the SSI provider 144 retrieves the designated PII information from the customer off the BC and provides to wallet app 123.

Account manager 124 obtains the designated PII information for onboarding a new account that never existed or for onboarding existing accounts that are opting-in for W2W structured message cross-channel authentication services. Account manager 124 obtains the relationship DID and DID for the customer's SSI-enabled wallet and creates an account with the designated PII information, the DID, and the relationship DID is stored in records of the account during onboarding or account manager 125 stores the DID and relationship DID in account records of an existing account of the customer during onboarding.

At this point, any of the customer's retained PII information in the account records can be searched to obtain the relationship DID and the DID for the customer's SSI-enabled wallet.

Now, when the customer reaches out to the FI through any channel (such as through texting, phone, email, in person, in store, etc.), the customer can be authenticated without being required to provide any PII over the channel the customer reached out in for purposes of verifying/authenticating an identity of the customer by staff of the FI. This process is referred to as SSI W2W structured message cross-channel authentication herein and below.

For example, suppose the customer calls a call center of the FI to ask questions about or perform transactions on their account. The phone number called in by the customer can be used to search the accounts and find the account records corresponding to that phone number. The specific account associated with that phone number is also associated with the relationship DID and DID for the customer's SSI-enabled wallet. Alternatively, the phone number can be used to obtain the relationship DID and DID from SSI-enabled wallet manager 113.

Once the relationship DID and DID are known, the FI employee can use FI wallet app 123 to request specific PII from the customer through off channel wallet app 123-to-wallet app 133 (W2W) communication (off-channel because the customer initiated the request with the FI through a phone call which is different from the W2W communication where the specific PII is being requested of the customer for authenticating the customer for access to the customer's account).

FI wallet app 123 uses the relationship DID to send a structured message to wallet app 133 that requests the PII information from the customer. This is a cryptographically signed message, signed by the FI wallet app 123 sent off chain (without the BC) to wallet app 133. If the customer is on the phone with the FI employee, the employee instructs the customer to open their wallet app 133 and please answer the questions. The customer opens the wallet app 133 (either through an option selected within the user-facing interface menus of banking app 134 or through directly opening the wallet app 113). The questions posed in the structured message are decrypted and verified by wallet app 133 and presented to the customer. The customer can answer the questions or simply press an option to authorize the communication with the FI employee. This causes the authorization and/or answers to the questions to be encrypted and signed (cryptographically signed) by wallet app 133 and sent back to a relationship DID and DID is associated with wallet app 123 (the relationship DID and DID is provided with the structured message when sent from wallet app 123).

The FI employee opens FI wallet app 123 and sees the structured message received from the customer through the customer's wallet app 133. The employee sees an authorization or sees answers to the original questions (challenge) posed by the employee. Any answers to the challenge are compared against what is available to the employee through the account records of the customer.

The customer is then authenticated for obtaining service from the FI employee. The customer can now direct funds be moved, withdraw funds, transfer funds, and/or obtain account balance information through the employee over the phone call. Notice that at no point did the customer provide PII over the phone call (voice channel), such that if the voice channel was compromised the PII is not exposed over the channel. The customer was authenticated via structured messages between two SSI-enabled wallets (one held by the FI, and one held by the customer). The connections were secure encrypted DID connections for the structured messaging and the contents of the messages were cryptographically signed and verified.

It is noted, that if the customer reached a service representative via a text channel, the process described above is the same. The structured message challenge is sent off channel (here the channel is a text channel) through a secure W2W channel that is encrypted and signed. The same can be said for a customer request for service over other channels as well, such as when the customer is in person, such that the customer does not have to show any identification card, rather the staff can initiate the W2W challenge, and the customer can respond via his wallet app 133 on his phone (assuming in-person requests do not require photo identification based on KYC requirements, but this can be dispensed with still if facial recognition is used during the in-person visit).

The structured messaging is off chain meaning it does not write to the BC or the distributed ledger of the BC.

In an embodiment, the SSI-enabled wallet of the customer and the FI are maintained and managed by SSI-enabled wallet manager 113, such that the relationship DIDs are provided to wallet app 133 and to wallet app 123 by manager 113 when requested.

In an embodiment, system 100 does not require SSI-enabled wallet manager 113; rather, wallet app 123 and wallet app 133 are enhanced to perform the structured message passing off chain using SSI-enabled wallets.

In an embodiment, as was stated above, the SSI providers 144 for the customers can be access through BC servers 140, through cloud server 110, through FI server 120, or through any server or cloud not referenced in FIG. 1.

In an embodiment, during onboarding of a new customer for a new account, the customer signs up for a user identifier and credential, downloads banking app 134 and enters the user identifier and credential. Once signed into app 134, a user-facing interface provides an option for the customer to opt-in for structured-messaging authentication across channels of communication. When the customer selects the opt-in option, account manager 124 and/or app 134 causes an SSI-enabled wallet to be created for the customer through an SSI provider 144. Once the SSI-enabled wallet is created, the wallet app 133 is installed on user device 130. During initialization, wallet app 123 creates a DID connection to wallet app 133; this establishes a relationship DID for wallet app 123 to subsequently connect and send structured messages directly to wallet app 133. Account manager 124 obtains the relationship DID and DID and stores it in account records for the customer that opted in and was onboarded with the FI. The relationship DID and DID can be found during any account access for the customer.

In an embodiment, account records for an account of the customer include blocked records containing sensitive PII of the customer, such that employees of the FI cannot see the sensitive PII until the customer is verified with the structured messaging W2W authentication discussed herein and above. Even through the account records are blocked from viewing by the employees, the records can be searched by the employees with a phone number or anything else (such as email number, account number, full name, etc.) the customer wants to provide for purposes of locating the relationship DID and DID, which are not blocked from view by the employees. This adds an extra layer of security for PII of customers and guards against untrusted employees that may be tempted to perform nefarious actions with PII of customers.

The embodiments of FIG. 1 and other embodiments are now discussed with reference to the FIGS. 2-3.

Figure 2:
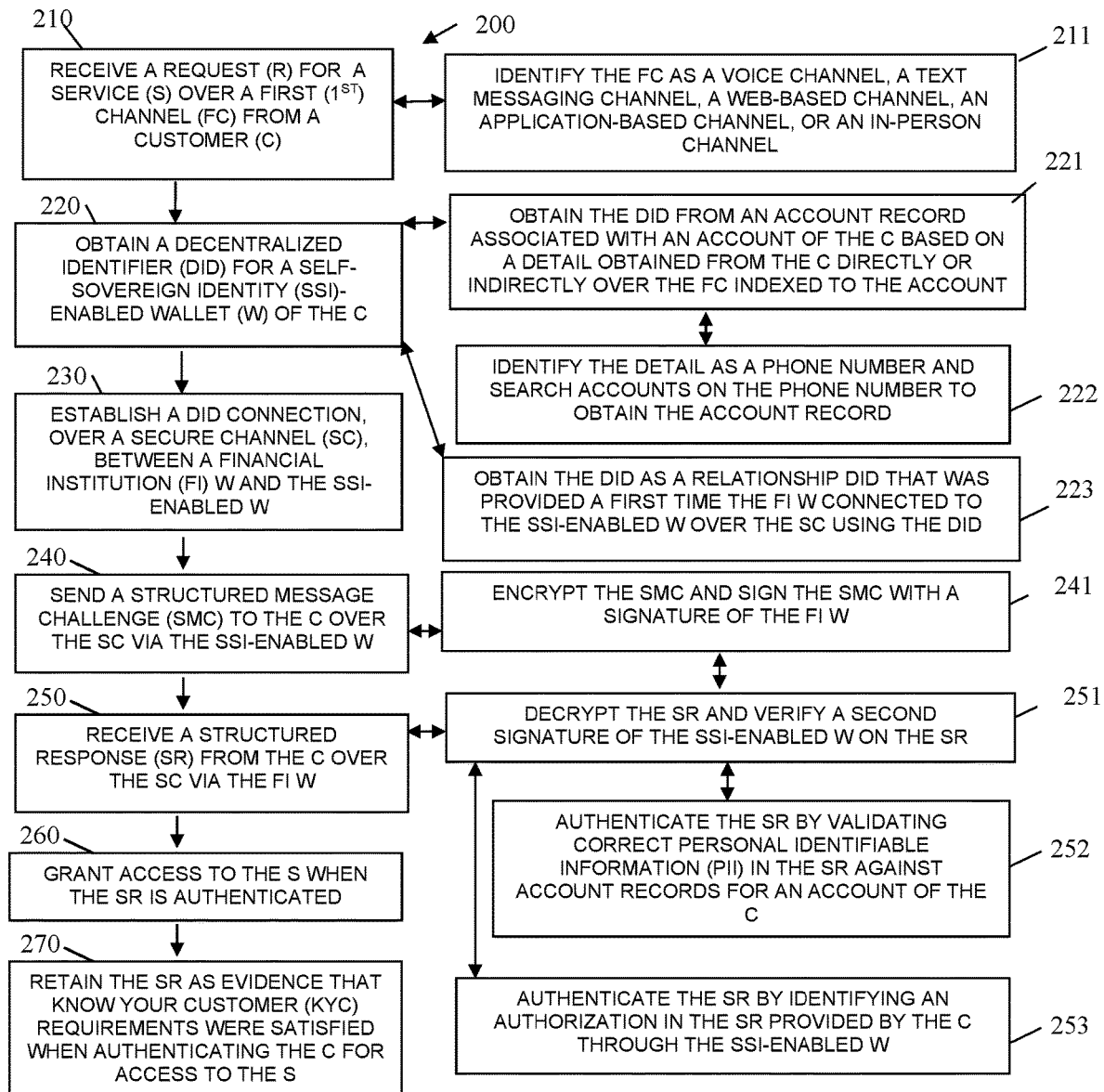
FIG. 2 is a diagram of a method for SSI structured messaging for cross-channel authentication, according to an example embodiment.

FIG. 2 is a diagram of a method 200 for SSI structured messaging for cross-channel authentication, according to an example embodiment. The software module(s) that implements the method 200 is referred to as a "SSI structured messaging authenticator." The SSI structured messaging authenticator is implemented as executable instructions programmed and residing within memory and/or a non-transitory computer-readable (processor-readable) storage medium and executed by a plurality of hardware processors of a plurality of hardware computing devices. The processors of the devices that execute the SSI structured messaging authenticator are specifically configured and programmed to process the SSI structured messaging authenticator. The SSI structured messaging authenticator has access to one or more networks during its processing. The networks can be wired, wireless, or a combination of wired and wireless.

In an embodiment, the devices that execute the SSI structured messaging authenticator is all of, or any combination of, cloud/server 110, server 120, user-operated device 130, and/or servers 140. In an embodiment, a plurality of servers cooperate to execute the SSI structured messaging authenticator from one or more logical cloud servers 110, 120, 130, and/or 140.

In an embodiment, the SSI structured messaging authenticator is all or some combination of 113, 114, 123, 124, 133, 134, and/or 144, discussed above with system 100.

At 210, the SSI structured messaging authenticator receives a request for a service over a first channel from a customer.

In an embodiment, at 211, the SSI structured messaging authenticator identifies the first channel as a voice channel, a text message channel, a web-based channel, an application-based channel, or an in-person channel.

At 220, the SSI structured messaging authenticator obtains a DID for an SSI-enabled wallet of the customer.

In an embodiment, at 221, the SSI structured messaging authenticator obtains the DID from an account record associated with an account of the customer based on a detail obtained from the customer directly or indirectly over the first channel indexed to the account.

In an embodiment of 221 and at 222, the SSI structured messaging authenticator identifies the detail as a phone number and searches accounts on the phone number to obtain the account record.

In an embodiment, at 223, the SSI structured messaging authenticator obtains the DID as a relationship DID that was provided a first time the FI wallet connected to the SSI-enabled wallet over the secure channel using the DID.

At 230, the SSI structured messaging authenticator establishes a DID connection, over a secure channel, between the FI wallet and the SSI-enabled wallet.

At 240, the SSI structured messaging authenticator sends a structured message challenge to the customer over the secure channel via the FI wallet.

In an embodiment, at 241, the SSI structured messaging authenticator encrypts the structured message challenge and signs the structured message challenge with a signature of the FI wallet.

At 250, the SSI structured messaging authenticator receives a structured response from the customer over the secure channel via the FI wallet.

In an embodiment of 241 and 250, at 251, the SSI structured messaging authenticator decrypts the structured response and verifies a second signature of the SSI-enabled wallet on the structured response.

In an embodiment of 251 and at 252, the SSI structured messaging authenticator authenticates the structured response by validating correct PII in the structured response against account records for an account of the customer with the FI.

In an embodiment of 251 and at 253, the SSI structured messaging authenticator authenticates the structured response by identifying an authorization in the structured response provided by the customer through the SSI-enabled wallet.

At 260, the SSI structured messaging authenticator grants access to the service when the structured response is authenticated.

In an embodiment, at 270, the SSI structured messaging authenticator retains the structured response as evidence that KYC requirements were satisfied when authenticating the customer for access to the service.

Figure 3:
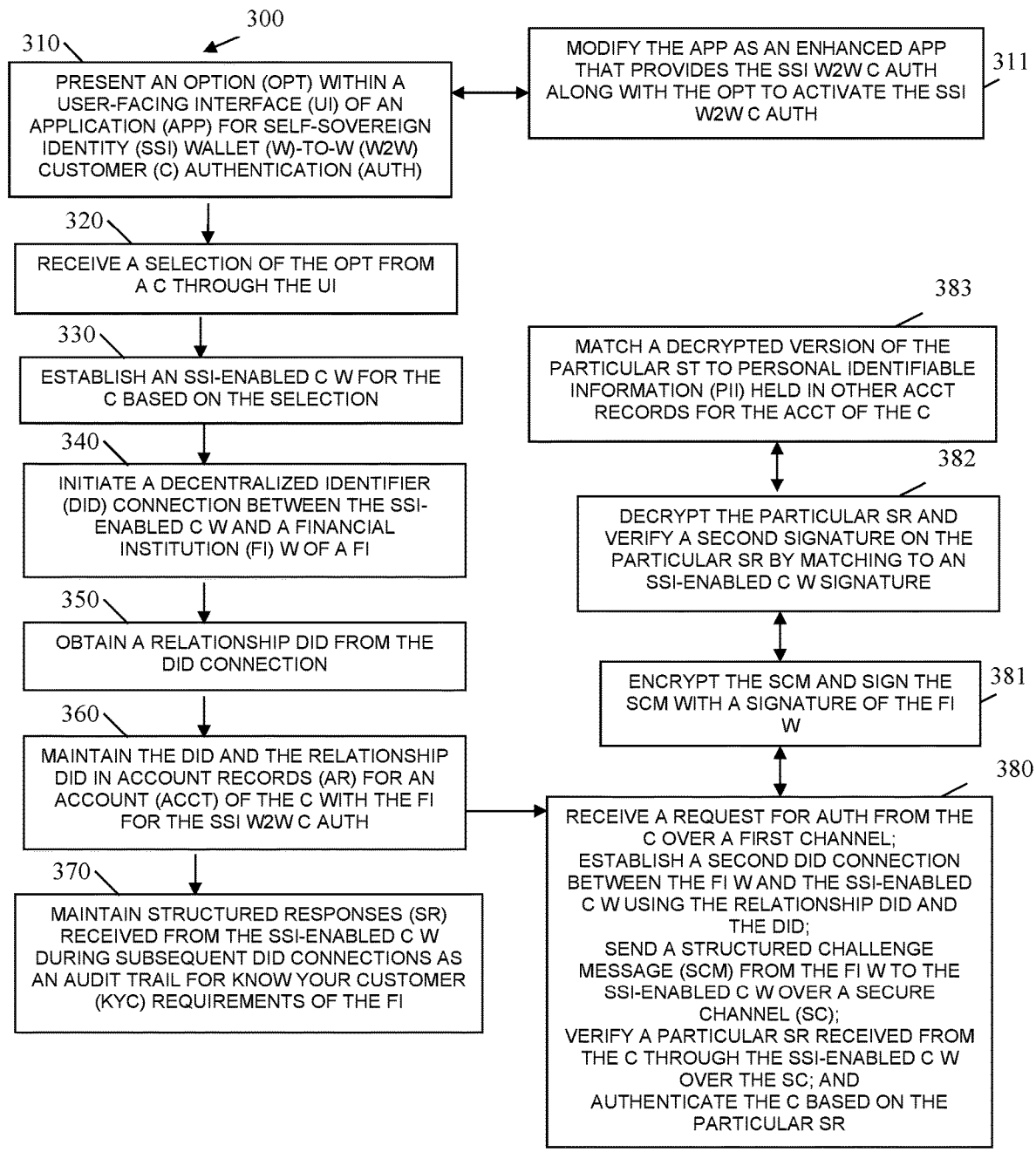
FIG. 3 is a diagram of another method for SSI structured messaging for cross-channel authentication, according to an example embodiment.

FIG. 3 is a diagram of another method 300 for SSI structured messaging for cross-channel authentication, according to an example embodiment. The software module(s) that implements the method 300 is referred to as a "cross-channel PII authenticator." The cross-channel PII authenticator is implemented as executable instructions programmed and residing within memory and/or a non-transitory computer-readable (processor-readable) storage medium and executed by one or more hardware processors of one or more hardware devices. The processors of the devices that execute the cross-channel PII authenticator are specifically configured and programmed to process the cross-channel PII authenticator. The cross-channel PII authenticator has access to one or more networks during its processing. The networks can be wired, wireless, or a combination of wired and wireless.

The cross-channel PII authenticator presents another and, in some ways, enhanced processing perspective of that which was described above with the method 200.

In an embodiment, the cross-channel PII authenticator is executed by one, all, or some combination of devices 110, 120, 130, and/or 140.

In an embodiment, the cross-channel PII authenticator is all or some combination of 113, 114, 123, 124, 133, 134, 143, 144, and/or method 200.

At 310, the cross-channel PII authenticator presents an option within a user-facing interface of an application for SSI W2W customer authentication.

In an embodiment, at 331, the cross-channel PII authenticator modifies the application as an enhanced application that provides the SSI W2W customer authentication along with the option to activate the SSI W2W customer authentication.

At 320, the cross-channel PII authenticator receives a selection of the option from the customer through the user-facing interface.

At 330, the cross-channel PII authenticator establishes an SSI-enabled customer wallet for the customer based on the selection.

At 340, the cross-channel PII authenticator initiates a DID connection between the SSI-enabled customer wallet and a FI wallet of a FI.

At 350, the cross-channel PII authenticator obtains a relationship DID from the DID connection.

At 360, the cross-channel PII authenticator maintains the DID and the relationship DID in account records for an account of the customer with the FI for processing the SSI W2W customer authentication.

In an embodiment, at 370, the cross-channel PII authenticator maintains structured responses received from the SSI-enabled customer wallet during subsequent DID connections as an audit trail for KYC requirements of the FI.

In an embodiment, at 380, the cross-channel PII authenticator receives a request for authentication from the customer over a first channel. The cross-channel PII authenticator establishes a second DID connection between the FI wallet and the SSI-enabled customer wallet using the relationship DID and the DID. The cross-channel PII authenticator sends a structured challenge message from the FI wallet to the SSI-enabled customer wallet over a secure channel. The cross-channel PII authenticator verifies a particular structured response received from the customer through the SSI-enabled customer wallet over the secure channel. The cross-channel PII authenticator authenticates the customer based on the particular structured response.

In an embodiment of 380 and at 381, the cross-channel PII authenticator encrypts the structured challenge message and signs the structured challenge message with a signature of the FI wallet.

In an embodiment of 381 and at 382, the cross-channel PII authenticator decrypts the particular structured response and verifies a second signature on the particular structured response by matching the second signature to an SSI-enabled customer wallet signature.

In an embodiment of 382 and at 383, the cross-channel PII authenticator matches a decrypted version of the particular structured response to PII held in other account records for the account of the customer with the FI.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   presenting an option within a user interface of an application to opt-in for Self-Sovereign Identity (SSI) wallet-to-wallet (W2W) customer authentication;
   receiving a selection of the option from a customer through the user interface;
   establishing an SSI-enabled customer wallet for the customer based on the selection using an SSI provider managed on a financial institution (FI) server;
   initiating a Decentralized Identifier (DID) connection between the SSI-enabled customer wallet and a wallet of a FI;
   obtain a relationship DID from the DID connection;
   maintaining the DID and the relationship DID in account records for an account of the customer with the FI for the SSI W2W customer authentication; and
   authenticating the customer via encrypted and signed structured messages between the SSI-enabled customer wallet and the FI wallet over a secure channel that prevents exposure of Personal Identifiable Information (PII) over other communication channels used by the customer to contact the FI.

2. The method of claim 1 further comprising, maintaining structured responses received from the SSI-enabled customer wallet during subsequent DID connections as an audit trail for Know Your Customer (KYC) requirements of the FI.

3. The method of claim 1 further comprising:
   receiving a request for authentication from the customer over a first channel;
   establishing a second DID connection between the FI wallet and the SSI-enabled customer wallet using the relationship DID and the DID;
   sending a structured challenge message from the FI wallet to the SSI-enabled customer wallet over a secure channel;
   verifying a particular structured response received from the customer through the SSI-enabled customer wallet over the secure channel; and
   authenticating the customer based on the particular structured response.

4. The method of claim 3, wherein sending the structured challenge message further includes encrypting the structured challenge message and signing the structured challenge message with a signature of the FI wallet.

5. The method of claim 4, wherein verifying further includes decrypting the particular structured response and verifying a second signature on the particular structured response matches an SSI-enabled customer wallet signature.

6. The method of claim 5, wherein verifying further includes matching a decrypted version of the particular structured response to Personal Identifiable Information (PII) held in other account records for the account of the customer.

7. The method of claim 1 wherein presenting further includes modifying the application as an enhanced application that provides the SSI W2W customer authentication along with the option to activate the SSI W2W customer authentication.

8. The method of claim 1, wherein initiating further include initiating the DID connection as a peer-to-peer (P2P) encrypted connection between the FI wallet and the SSI-enabled customer wallet.

9. A system comprising:
   a plurality of servers comprising a plurality of processors, each server comprises a non-transitory computer-readable storage media;
   each non-transitory computer-readable storage medium comprising executable instructions;

the executable instructions when executed by their corresponding processors performing operations comprising:

receiving an opt-in option from a user interface of a Financial Institution (FI) application operated by a customer indicating that the customer is opting-in for Self-Sovereign Identity (SSI) wallet-to-wallet (W2W) customer authentication;

establishing an SSI-enabled customer wallet for the customer based on a selection of the opt-in option by the customer from the user interface of the FI application using an SSI provider managed on a FI server;

initiating a Decentralized Identifier (DID) connection between the SSI-enabled customer wallet and a FI wallet of a FI;

obtaining a relationship DID from the DID connection;

maintaining the DID and the relationship DID in account records for an account of the customer with the FI for the SSI W2W customer authentication during contacts by the customer with the FI; and authenticating the customer via encrypted and signed structured messages between the SSI-enabled customer wallet and the FI wallet over a secure channel that prevents exposure of Personal Identifiable Information (PII) over other communication channels used by the customer to contact the FI.

10. The system of claim 9, wherein the operations comprise additional operations comprising:

encrypting structured messages sent over subsequent DID connections between the FI wallet and the SSI-enabled customer wallet during the contacts for authenticating the customer with the SSI W2W customer authentication; and digitally signing the structured messages by the FI wallet and by the SSI-enabled customer wallet over the subsequent DID connections during the contacts for authentication the customer with the SSI W2W customer authentication.

* * * * *